United States Patent [19]

Nimmersjo

[11] 3,956,671

[45] *May 11, 1976

[54] PROTECTION DEVICE FOR OBJECTS INCLUDED IN ELECTRICAL POWER SUPPLY NETWORKS

[75] Inventor: Gunnar Nimmersjo, Vasteras, Sweden

[73] Assignee: Allmanna Svenska Elektriska Aktiebolaget, Vasteras, Sweden

[ * ] Notice: The portion of the term of this patent subsequent to Apr. 15, 1992, has been disclaimed.

[22] Filed: Aug. 1, 1974

[21] Appl. No.: 493,915

[30] Foreign Application Priority Data

Aug. 22, 1973 Sweden.............................. 7311395

[52] U.S. Cl............................... 317/43; 317/27 R; 317/39
[51] Int. Cl.²......................................... H02H 3/38
[58] Field of Search.................. 317/27 R, 36 D, 39, 317/43, 47; 324/83 A, 83 D, 52; 328/133

[56] References Cited
UNITED STATES PATENTS 3,878,460   4/1975   Nimmersjo............................ 324/52

Primary Examiner—J D Miller
Assistant Examiner—Patrick R. Salce

[57] ABSTRACT

A protection device for lines, bus bars, transformers and the like in electrical networks includes for each object a directional wave detector arrangement with one detector unit per phase for sensing current and voltage transients occurring in the object in case of faults in the network. Each wave detector unit includes directional detecting devices and a plurality of level detectors connected with an output for tripping signals and an output for blocking signals. One directional wave detector unit is arranged for each connection to an object which is to be protected and is connected through level detectors to the logic system which compares the output signal from the directional wave detector for the object and disconnects the object in response to a tripping signal from any of the directional wave detectors only if none of the wave detectors has emitted a blocking signal.

6 Claims, 6 Drawing Figures

PROTECTION DEVICE FOR OBJECTS INCLUDED IN ELECTRICAL POWER SUPPLY NETWORKS

BACKGROUND OF THE INVENTION

1. Field of the Invention

When a fault occurs in an electrical power supply network, an electrical travelling wave will propagate in the network and, because of repeated reflections in various discontinuities in the network, such as transformers, stations and the source of the fault, currents and voltages will contain transients which are inconvenient for measuring relays in the relay protection devices. The frequencies dominating in these transients depend on the distance to the fault and the network configuration. Investigations have shown that, even with the introduction of suppression filters for the transients, it will be difficult to use, for example, conventional impedance relays for relay protection devices, the operating time of which is to be less than the time of a cycle. In case of higher system voltages, higher demands are placed on the rapidity of the relay protection devices, while at the same time the damping of the transient waves decreases. The application of traditional measuring principles for the relay protection devices will therefore be more difficult to carry out.

SUMMARY OF THE INVENTION

The present invention relates to a protection device for objects included in electrical power networks, such as lines, busbars, transformers or the like. For each object the protection device contains at least one directional wave detector, each one comprising at least one wave detector unit per phase for sensing the current and voltage transients occurring in the object in case of a fault in the power supply network. Each wave detector has at least one output for tripping signals and at least one output for blocking signals from directional detectors included in the wave detector, each of said signal outputs being connected to a level detector.

According to the invention, there is provided a logic system for the protection of the object, which is connected through level detectors to the directional wave detector and which includes means to compare the output signals from the directional wave detectors for the object and to disconnect the object in response to a tripping signal from any of the directional wave detectors only when none of the wave detectors has emitted a blocking signal.

DESCRIPTION OF THE PREFERRED EMBODIMENTS

Figure 1:
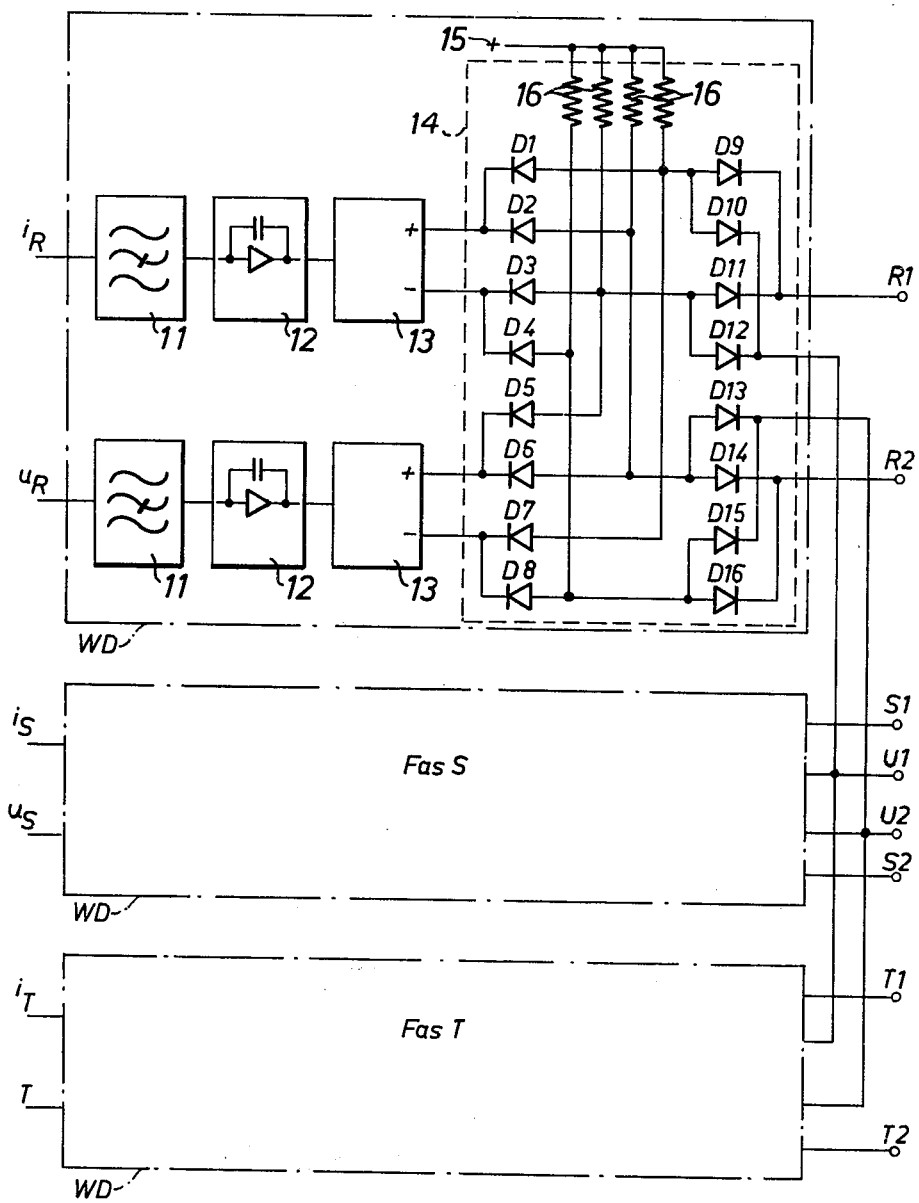
FIG. 1 shows a three-phase directional wave detector which is known at least in principle through the Nimmersjo patent application Ser. No. 411,806, filed Nov. 1, 1973 now U.S. Pat. No. 3,878,460.

FIG. 1 shows a three-phase, directional wave detector WD which forms the basic component of the protection device and on the function of which the protection function is based. The wave detector has three inputs $i_R$, $i_S$, $i_T$ for current measurement result signals in the three phases R, S, and T and three inputs $u_R$, $u_S$ and $u_T$ for voltage measurement result signals corresponding to the three phase currents through the point of measuring and three suitably selected phase voltages, respectively. A band exclusion filter 11, which blocks the component of the input signal which has the same frequency as the power supply network, is connected to an integrating circuit 12. A sign indicator 13 has a + output and a − output and directs the integrated signal to the + output if it is positive, whereas if the signal is negative it is fed to the − output as a positive signal.

The directional detector 14 is built up of a number of diodes D1 - D16, which, as the figure shows, are connected to the + pole 15 of a voltage source by way of resistor 16. The directional detector emits a signal on its outputs R1 and U1 if the signals to the two sign indicators 13 have different signs, whereas an output signal occurs on the outputs R2 and U2 if the signals to the sign indicators have the same signs. The output signal is positive in the embodiment shown in the figure and its amplitude corresponds to the amplitude of the smallest of the input signals to the sign indicators 13. On the outputs U1 and U2, which are common for all three phases, the biggest of the signals occurring on R1, S1, T1 and R2, S2, T2, respectively, is obtained. This is due to the fact that the directional detectors are provided with diodes D9 - D16 on their outputs.

In each connection to an object, the positive current direction is defined as the direction towards the object, object No. 1. If a travelling wave moves in the negative direction, this gives rise to tripping signals on R1, S1 or T1 and on U1 which are called tripping outputs, and if the wave moves in the positive direction blocking signals are obtained on R2, S2 or T2 and on U2, and these outputs are called blocking outputs. If the same wave detector is used for protection of an adjacent object as well, object No. 2, the blocking signals will have a tripping effect and the tripping signals a blocking effect for the latter object, which will be dealt with in connection with FIG. 6.

Protection operation:

Every fault causes transient waves which spread in the network from the site of the fault. The breakers which are to be used for disconnection of a faulty object constitute measuring points for at least one wave detector. As mentioned before, the objects consist of lines, busbars, transformers or the like.

In this way a wave detector is arranged for each connection of an object, that is one wave detector is provided at each end point of a line, one wave detector at each output line from a busbar and one wave detector on either side of a transformer.

Each individual wave detector indicates whether faults occur and in which direction the fault is located by its output signal, caused by the fault, on the tripping or blocking output. The signals from the wave detectors which are linked to a certain object are supplied to a protection logic system belonging to the object, the purpose of said logic system being to prevent the protected object from being disconnected if any of the connected wave detectors emits a blocking signal during the passage of the first travelling wave through the measuring point. If no blocking occurs, the tripping signals are allowed to influence at least one breaker for disconnection of the object. If the object is a power transmission line, the logic system must also include a telecommunications channel for transmitting blocking signals to the other end of the line.

Figure 2:
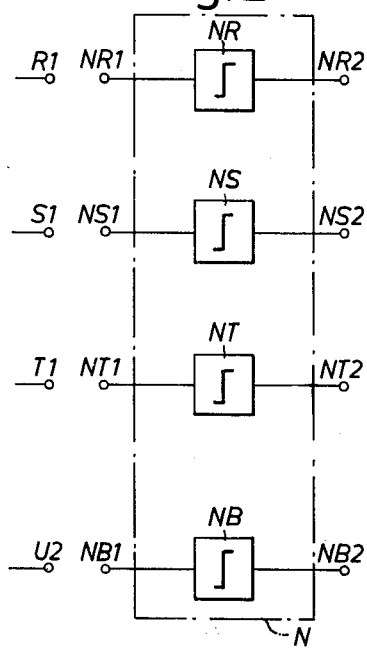
FIG. 2 shows a level detector for direct connection to the wave detector.

Design:

The tripping signals from the wave detector in FIG. 1 are supplied to inputs on a level detector N in FIG. 2. The level detector consists of four detector parts, one of each phase NR, NS, NT and a blocking part NB. The output R1 is thus connected to the input NR1 on the detector part NR, S1 is connected to NS1 and T1 is connected to NT1. The common blocking output U2 is connected to NB1 on the part NB. The level detector parts transmit output signals on their respective outputs NR2, NS2 and NT2 if the functional value set is exceeded by the input signal, NR, NS and NT deliver "ones" for tripping and NB delivers a "one" for blocking. Normally "zeros" appear on the outputs.

Figure 3:
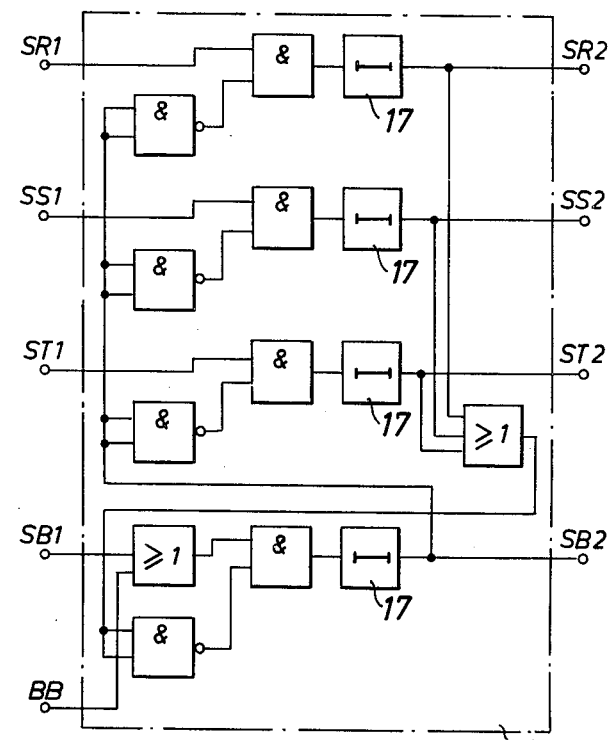
FIG. 3 shows a sequence detector for connection to the outputs of the level detector.

In order that the transient sensing protection device according to the invention may operate, a sequence detector with delayed re-set may be used in the logic system. A sequence detector S suitable for the purpose is shown in FIG. 3. As the figure shows, it is built up of known components. The inputs SR1, SS1 and ST1 are called tripping inputs and are intended to be connected to corresponding outputs NR2, NS2 and NT2 on the level detector N. The said inputs are tripping inputs and the input SB1, which is to be connected to the output NB2 of the level detector, is the blocking input. If, in case of a fault, any of the level detector parts NR, NS or NT gives a "one" before NB gives a "one," the output SB2 will have a "zero" for the period during which any of NR, NS or NT gives a "one" plus the time constituting the reset time of the sequence detector for tripping signals and which is determined by its delay device 17. Each of the tripping outputs SR2, SS2 and ST2 will have a "zero" for the time during which NB gives a "one" plus the reset time for the blocking signal if NB first emits a "one." In this way it is assured that only the first travelling wave through the measuring point is able to influence the protection logic system on each occurrence of a fault, and by the delay of the reset a safe tripping signal to the breaker is obtained.

Figure 4:
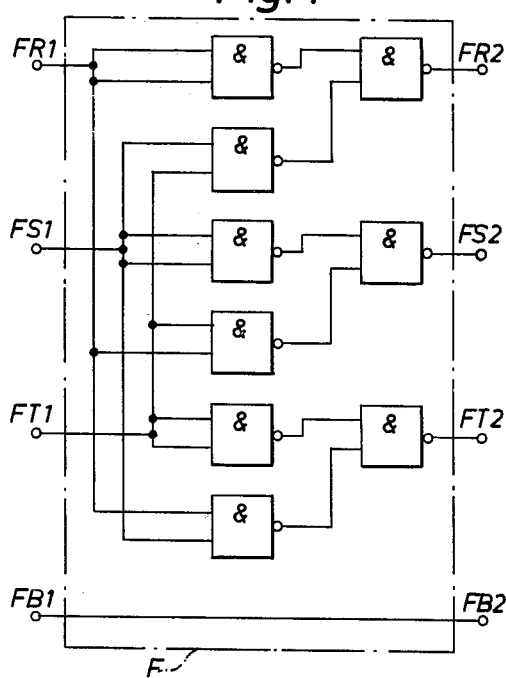
FIG. 4 shows a phase selector.

For unipolar release of the breaker in the event of a single-phase earth fault, the protection logic system includes a phase selector F shown in FIG. 4. This is also built up of simple logical circuits and the figure is only an example of its construction. The phase selector delivers a "one" on all outputs FR2, FS2 and FT2 if at least two of the inputs FR1, FS1 and FT1 have a "one." If, on the other hand, only one of the inputs receives a "one," only the corresponding output will emit a "one."

Figure 5:
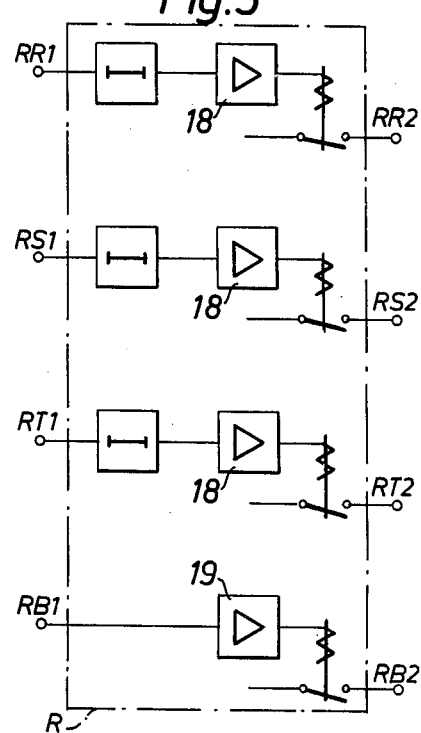
FIG. 5 shows tripping relays and a blocking relay.

In those cases where the protected object is a line, a possible blocking signal from the other end of the line must be awaited and therefore the tripping must be delayed to allow such a blocking signal to get safely through in time. The delay is achieved by means of the relay unit R according to FIG. 5, which includes three tripping relays 18 with delayed operation. The delay of operation can be varied to adapt to the delay of the telecommunications channel transmitting the signals between the two ends of the line. In addition, the relay unit comprises a blocking relay 19 which is connected to the blocking output SB2 of the sequence detector S by way of phase selector F.

If the protection device is to perform a three-pole disconnection for all types of faults, the input NR1 on the level detector is connected to the common output U1 of the wave detector, shown in FIG. 1, whereas the level detector parts NS and Nt are excluded. The sequence detector S is simplified in a similar way and the phase selector F is completely omitted. Only a tripping relay and a blocking relay in the relay unit R are needed.

If a breaker is located within the protected object, it may happen that normal closings of the breaker are interpreted as faults by a wave detector. Because of this it must be possible to block the tripping circuits by applying a "one" on the input BB of the sequence detector during closing of the breaker. This releases a blocking signal on the blocking output SB2 of the sequence detector and the tripping of the breakers is blocked.

By connecting the tripping output U1 of the wave detector WD to a further level detector N3 with delayed reset in a simplified sequence detector which also includes detector S3 and tripping relay R3, where S3 is normally blocked by a continuous blocking signal from a relay R, and by giving this level detector a higher level for operation than the ordinary level detector N1, corresponding to level detector N in FIG. 2, it will be possible to change the sensitivity of the protection device. The relay R is connected to the breaker which is to be controlled by the protection device and transmits blocking signals either to the input BB on the sequence detector S1 or to the additional sequence detector S3. This results in the fact that, at the same time that the sequence detector S1 is blocked by a signal from R to the blocking contact BB, the blocking signal to S3 ceases, after which the new sensitivity for operation, determined by N3, is applicable. The relay unit R3 must then immediately release the breaker, to which the relevant wave detector is coupled, in case the new higher level is exceeded. This procedure is appropriate if the voltage is measured on the busbar side of the line breaker, since a normal switching in of the line involves a disturbance on the protected line which may cause an unjustified disconnection. The protection may still correctly cause a releasing function during switching into a fault since the higher level of N3 will then also be exceeded.

Figure 6:
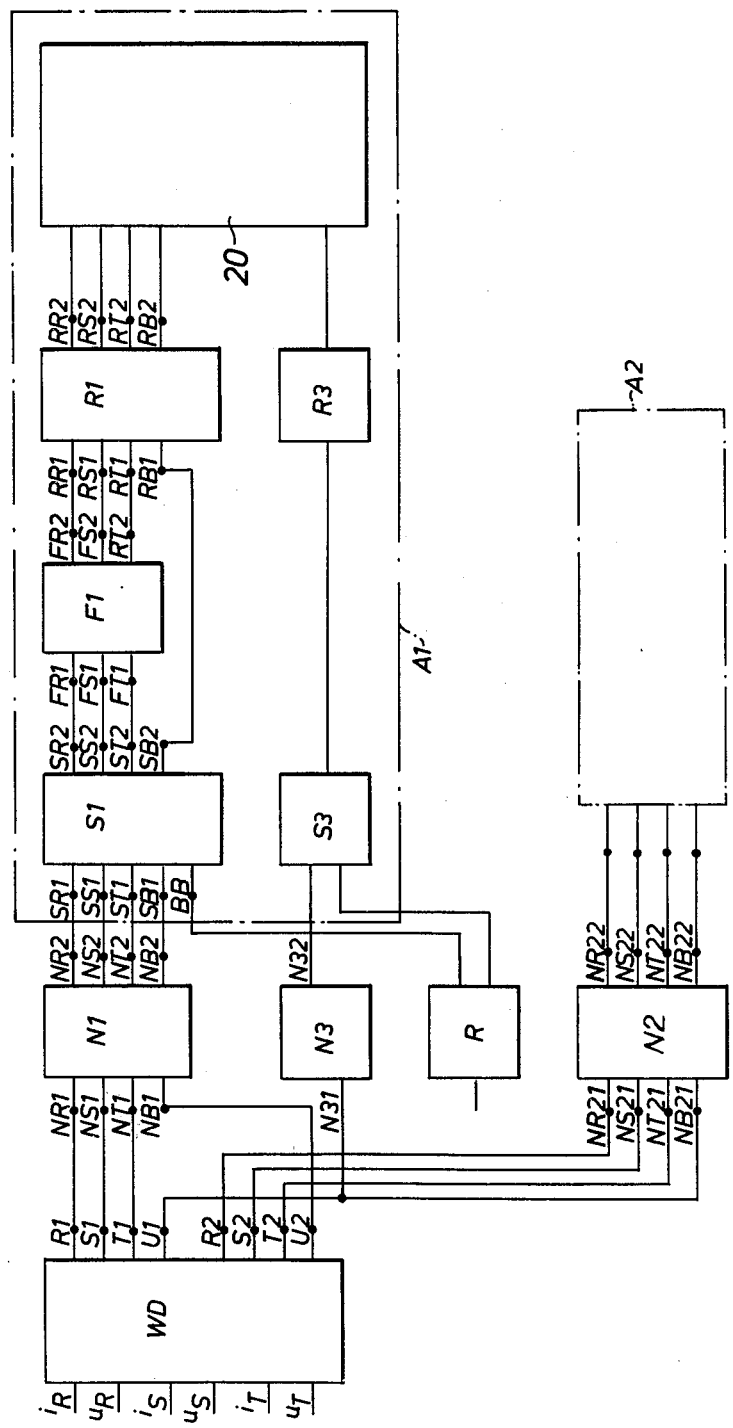
FIG. 6 shows how the units are put together to form a protection device.

In FIG. 6 the protection logic system which is required for a first object A1 is shown by dots and dashes at the upper right-hand corner of the figure. Within this frame for A1, the square 20 denotes circuits for the connection of other wave detectors, for communication between the wave detectors and release of breakers.

A wave detector can be used for protection of two adjacent objects. By the connection of a level detector N2 to the outputs R2, S2 and T2 of the wave detectors to N2's tripping inputs NR21, NS21 and NT21 and the output U1 to N2's blocking input NB21, the output signals of said level detector can be supplied with the protection logic system A2 for the object 2 from the outputs NR22, NS22, NT22 and NB22.

I claim:

1. Protection device for elements of electrical networks, comprising for each object at least one directional wave detector means, means connecting each of said directional wave detector means to the network, filter means (11) in said connecting means for filtering out the components of the input signals which have the same frequency as the network, each wave detector means comprising at least one wave detector unit per phase for sensing current and voltage transients occurring in the object in case of faults in the network, each wave detector unit (WD) including directional detector means and having at least one output for tripping signals and at least one output for blocking signals connected to said directional detector means included in the wave detector, a plurality of level detectors, said signal outputs each being connected to one of said level detectors, a logic system for the protection of the object, in which one directional wave detector (WD) is arranged for each connection to the object which is to be protected and connected through the level detectors to the logic system, said logic system including means to compare the output signals from the directional wave detectors for the object and to disconnect the object in response to a tripping signal from any of said directional wave detectors only when none of the wave detectors has emitted a blocking signal.

2. Protection device according to claim 1, including a sequence detector (S) with delayed reset and with at least one input (SR1, SS1, ST1) and at least one output (SR2, SS2, ST2) for tripping signals and an input (SB1) and an output (SB2) for blocking signals which has inputs connected to the outputs (NR2, NS2, NT2, NB2) of the level detector (N1) and outputs connected to the logic system, the sequence detector (S) including means to transmit a signal with a predetermined duration on one or more of its tripping outputs or on its blocking output in dependence on whether any of the tripping signals or the blocking signal first occur on their respective inputs to the sequence detector.

3. Protection device according to claim 2, in which the directional wave detector (WD) has at least three tripping outputs (R1, S1, T1) connected each to one level detector part (NR, NS, NT) the outputs of which (NR2, NS2, NT2) are each connected to a tripping input (SR1, SS1, ST1) of the sequence detector (S), the tripping outputs of which (SR2, SS2, ST2) are connected to the corresponding inputs (FR1, FS1, FT1) of a phase selector (F) for one-phase release of its circuit breaker if a signal occurs on only one of the inputs and for three-phase release if a signal ocurs on two or three inputs.

4. Protection device according to claim 1, including a relay unit (R) with inputs (RR1, RS1, RT1) for tripping signals and an input (RB1) for a blocking signal and containing at least one tripping relay (RR2, RS2, RT2) with variable pick-up delay and at least one instantaneously acting blocking relay (RB2).

5. Protection device according to claim 1, which further comprises at least one additional level detector (N3) which is set at a higher level of function and which has at least one input (N31) for tripping signals from the directional wave detector (WD) whereas its output (N32) is normally blocked, and means to stop this blocking at the same time that the first-mentioned level detectors receive blocking signals in case of breaker operations which concern the protected object.

6. Protection device according to claim 1, which comprises a level detector (N2) having at least one input (NR21, NS21, NT21) connected to a blocking output of the wave detector (WD) and an input (NB21) connected to a tripping output (U1) of the wave detector and having its outputs connected to a logic system (A2) belonging to an adjacent object and the connections between the directional wave detector (WD) and the level detector (N2) being such that a tripping signal of the wave detector is utilizied as a blocking signal for the adjacent object.

* * * * *